UNITED STATES PATENT OFFICE.

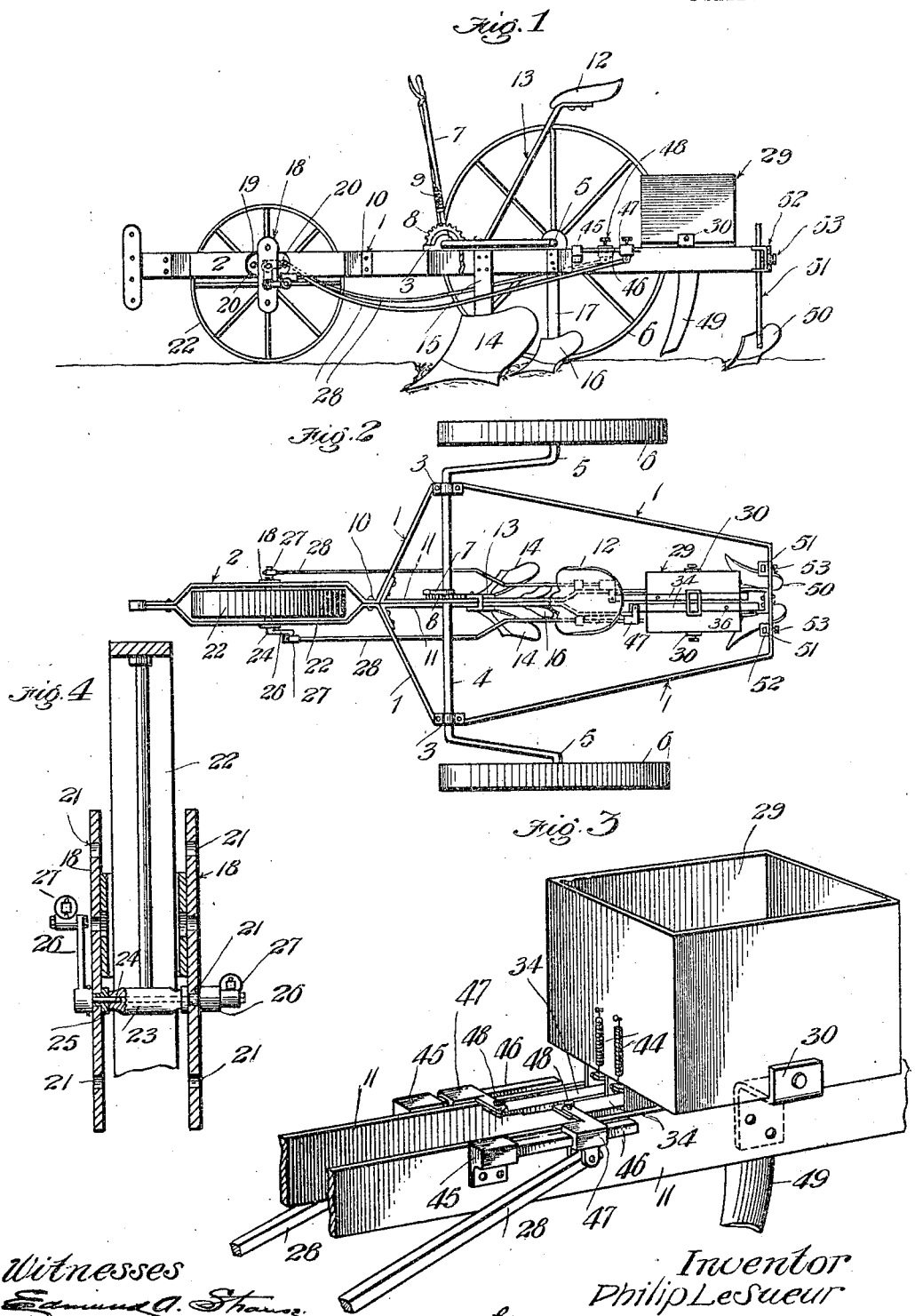

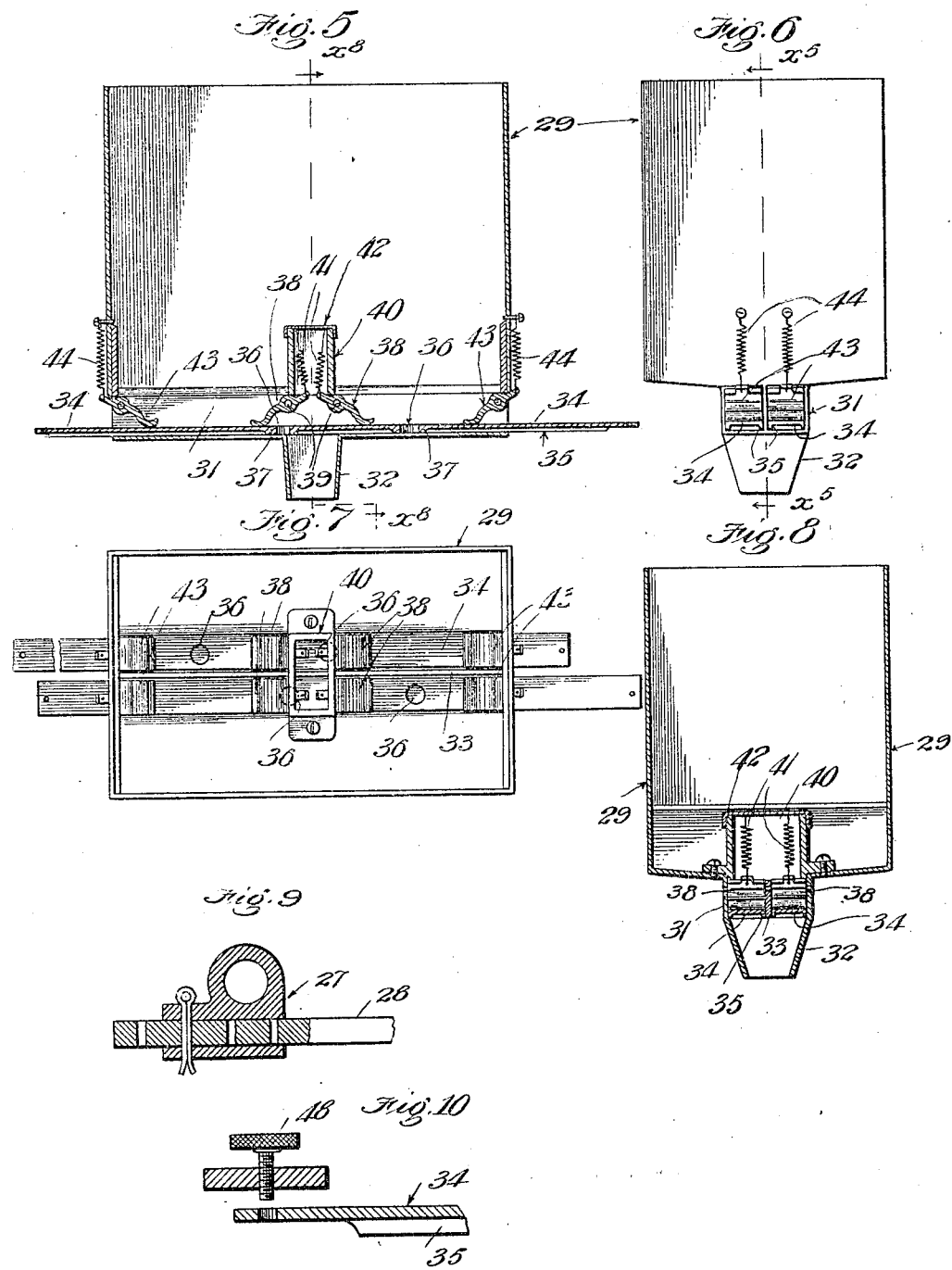

PHILIP LE SUEUR, OF LOS ANGELES, CALIFORNIA.

SEED-PLANTER.

No. 812,278.     Specification of Letters Patent.     Patented Feb. 13, 1906.

Application filed August 11, 1904. Serial No. 220,322.

*To all whom it may concern:*

Be it known that I, PHILIP LE SUEUR, a citizen of the United States, residing at Los Angeles, in the county of Los Angeles and State of California, have invented a new and useful Improved Seed-Planter, of which the following is a specification.

An object of the invention is to provide a cheap seed-planting machine having neither cogs nor chains, that will drop the full amount of corn needful for ensilage—peas, beans, &c.—which require to be planted thickly, and also to provide means by which the flow of seed may be quickly regulated from heavy to light, and vice versa, and also to cut off the seed flow quickly without removing any parts of the machine.

Another object is to provide a seed-planting machine adapted to plant seeds ranging from the size of Lima beans to mustard-seed.

Another object of the invention is to avoid the use of cogs and chains, which are ordinarily used to obtain great speed of the dropper-plates, and to substitute therefor a device which will drop the maximum amount of seed continuously and more effectively than by the use of cogs, chains, or large spring-actuated parts.

Another object of my invention is to provide improved cut-off adjustment for accommodating thick and thin dropper-plates.

Another object of my invention is to produce a seeding device that may be used on a common plow, a cultivator, a listing-plow, or a hillside-plow, as conditions may require, the device being provided with a seed cut-off, which makes it particularly valuable for use on a hillside-plow, as in plowing on a hillside seed is dropped only in every third or fourth row. Thus three or four furrows are plowed without dropping any corn. Then the seed is allowed to drop in the desired furrow to be covered by the next furrow turned.

Another object is to provide novel means, in combination with crank action, for raising and lowering the gage-wheel of the plow.

Another object is to provide a novel form of knuckle-joint bearing for the crank-journal, by means of which the pitman can be adjusted relative to the seeding device and crank motion.

Another object of my invention is to provide a novel discharge-chamber which receives the seed and concentrates the seed over the discharge-pipe.

Another object is to provide a double-slide planter having a firmer and more compact construction than heretofore, and to so arrange the parts of such planter as to relieve the dropper-slides of all strain liable to cramp, bend, or break the same, thereby allowing the use of very thin dropper-slides. I also provide for more readily disconnecting the dropper-slides from the gage-wheel, and also provide for supporting the pitmen when the dropper-slides are disconnected. In this respect cross-head guides are arranged on opposite sides of the beam in front of the hopper, and cross-heads are mounted on the respective guides, and pitmen connect said cross-heads with cranks on opposite sides of the gage-wheel, and I detachably connect the dropper-slides with the cross-heads respectively inside the beam, which is constructed with two side members or bars. I also provide adjustable automatic cut-off gates which are spring-actuated and are four in number, acting on top of the dropper-slide, which is provided with two seed-holes, which are each guarded on both sides of said gates.

The accompanying drawings illustrate the invention, and, referring thereto, Figure 1 i as side elevation of the planter with part of the framework of the plow removed to reveal the pitman connection with cross-head. Fig. 2 is a plan view of the device. Fig. 3 is a perspective of the planter and the adjacent portion of the plow-frame. Fig. 4 is an enlarged section through the front end of the plow-beam, the lower portion of the wheel being broken away. Fig. 5 is a vertical section taken through the hopper on line $X^5 X^5$, Fig. 6. Fig. 6 is an end elevation of the hopper. Fig. 7 is a plan view of the hopper. Fig. 8 is a section on line $X^8 X^8$, Fig. 5. Fig. 9 is a detail, partly in section, of the knuckle-joint and adjacent end of the pitman; and Fig. 10 is a detail, partly in section, of the cross-head connection with slide.

The frame of the plow shown comprises side bars 1, which at the forward end form a loop 2, and the rear portion of the frame comprises a large loop, formed by bending out the side bars. The side bars 1 are provided with journals 3, in which is revolubly mounted an adjustable axle 4, having crank-shaped axle ends 5, upon which are mounted large wheels 6.

The axle 4 may be adjusted to vary the position of the frame with respect to the wheels by means of a lever 7, rigidly attached to the axle 4, there being a suitable sector 8 and latch mechanism 9 for holding the lever and axle in the position desired.

A neck 10 is formed at the rear of the loop 2, from which point the side bars 1 spread out to form the large hind loop, and bolted, riveted, or otherwise secured to the side bars 1 adjacent the neck 10 is a center beam 11, comprising a pair of bars which extend through the center of the large loop and are bolted or otherwise secured to the back run of the loop. The bars are spread apart at an intermediate point in the loop. A seat 12 is mounted on the seat-spring 13, which is fastened to the beam 11 at a point adjacent the axle.

A listing-plow or double moldboard 14 is attached to the beam 11 by a standard 15, there being a subsoiler 16 attached back of the plow 14, which is mounted on a standard 17.

A pair of bearing-plates 18 are fastened to the side bars of the loop 2, having laterally-extending ears 19, through which bolts 20 pass to fasten the plates in position. The plates 18 are provided with a series of holes 21 at various elevations.

23 designates the hub of the wheel 22, and 24 is an axle which passes through the hub and through the bearing-plates 18, there being movable bushings 25 arranged within a set of holes 21 and forming bearings for the axle 24. The perforated plates 18 permit of adjusting the front wheel, with its axle and bushings up or down as occasion requires. To regulate depth of plowing, cranks 26 are keyed or otherwise fastened to the axle 24.

Mounted on the cranks 26 are knuckle-joints 27 with holes arranged at right angles to the crank-pin holes, which receive the end of pitmen 28. The pitman ends are each provided with a series of holes for receiving a cotter-pin, which passes through the knuckle-joint, as shown in Fig. 9. This permits of adjusting the pitmen in the knuckle-joints to agree with adjustments of the gage-wheel.

29 is a hopper which is mounted upon the beam 11, being attached thereto by angle-straps 30 and easily detachable. The bottom of the hopper 29 is provided with a central longitudinal trough 31, the bottom gently sloping from both side walls to the trough, as shown in Fig. 8. A central partition 33 extends longitudinally through the trough 31, thus forming two slideways, and slidably mounted in each slideway is a dropper plate or slide 34. Each slide 34 has narrow ribs 35 on its under surface, which rest upon the bottom of the trough 31 and form wearing-shoes for the slide, which enables the slides to be reciprocated with the least friction, and each slide is provided with seed-holes 36, there being bosses 37, in which the holes 36 are formed, and the bosses 37 bear close upon the bottom of the trough 31, so that the seed cannot work under the slides from the holes 36, and as the width of the slides is such that they completely fill the slideways the seed cannot work around the sides of the slides and get under them or become wedged in and interfere with the proper working of the slides.

40 is the cut-off chamber, in which are the cut-off gates, pivotally connected with the side walls of the slideway and yieldingly held against the upper faces of the slide by means of springs 41.

The cut-off chamber 40 is mounted directly above the pivoted gates, and the gates are yieldingly held against the upper faces of the slides 34 by means of springs 41, the discharge-chamber 40 being supplied with a suitable cover 42 for preventing seed from entering the discharge-chamber, which cover may readily be removed when desired to change the springs. Similar gates 43 are also pivoted at each end of each slideway and are likewise resiliently pressed against the upper faces of the slides 34 by springs 44 in order to keep the ends of the slides in close contact with the bottom of the hopper at the points where seed is most likely to escape.

Referring now particularly to Fig. 3, brackets 45 are attached to the beam 11, and extending rearwardly therefrom are guide-bars 46, on which are slidably mounted cross-heads 47, to which the rear ends of pitmen 28 are connected. Each cross-head 47 is provided with a screw 48, and the screws 48 slidingly engage in holes in both slides 34. Thus as the wheel 22 revolves the pitmen are actuated and operate the slides 34, and either one or both slides may be thrown out of operation by disconnecting them from the cross-heads by raising one or both of the screws 48. Attached to the beam of the planter is a delivery-spout 49 for conveying seed from the funnel 32 and delivering it to the proper point in the ground. Covering-plows 50 are carried by standards 51, adjustably supported on the rear of the frame 1 by clips 52 and set-screws 53.

In operation the corn or other seed is placed within the hopper, and, assuming that both slides 34 are connected to their cross-heads as the wheel 22 revolves, the slides will be reciprocated, and their holes 36 are so arranged with respect to their stroke that when a rod is at one extreme end of its stroke one of its holes will lie over the discharge-funnel 32 and its other hole will lie within the hopper and become filled with the seed.

As the slide is reciprocated the seed which has entered one of the holes in the slide is drawn under one of the central gates 38 and discharged into the chamber 32, the inclined walls of said chamber 32 concentrating the seed delivered by both slides at one point, directing the seed into the delivery-spout 49, from which the seed drops into the ground, while the other hole 36 of the same slide is in the meantime receiving its charge of seed, being outside of the gate 38. As the slide moves in the other direction the corn within the last-named hole is drawn under the adjacent gate 38 and discharged through the funnel 32 in like manner.

The cranks 26 are so arranged that one hole 36 of one slide is entering the discharge-chamber just as the hole of the opposite slide is leaving the discharge-point, as is illustrated in Fig. 7. It will be observed that the length of stroke of a slide 34 is sufficiently great to give the holes 36 ample time in which to fill when they are outside of the discharge-point and that the movement of the slide is also slower when the hole is outside of the discharge-point and also when the hole is at the discharge-point, the fastest movement of the slide being at an intermediate point. Thus ample time is given for filling the holes and for the discharge of seed from the hole.

It is obvious that the amount of seed which may collect in the hole and be discharged depends upon the thickness of the slide, so that by employing slides of different thicknesses the amount of seed delivered may be varied. The spring-controlled pivoted gates 38, which automatically adjust themselves, permit of utilizing slides of various thicknesses without necessitating any manual adjustment of the device.

I have provided four cut-off gates which automatically adjust themselves to thick and thin slides and exercise a continuous pressure against the top surface of the dropper-slides both fore and aft, thus keeping the slide in close contact with the bottom of the hopper, which is very important for dropping small seed. The front and back cut-off gates prevent any jamming or escaping of seed under the walls of the hopper.

The application of cut-off gates at each end of the seed-hopper is very important to the successful working of the slide form of planter, because, first, when thick or thin slides are introduced much time is saved by said cut-off gates adjusting themselves automatically to thick or thin slides; second, the jamming of the seed-corn on the rigid side walls of the ordinary hopper and the consequent stoppage of the slides is by the use of these cut-off gates entirely overcome.

What I claim is—

1. In combination with a plow-beam, a pair of plates bolted to the beam and having a series of holes, a pair of bushings in opposite holes, an axle through the bushings, a wheel on the axle, cranks on the axle, knuckle-joints on the axles, pitmen having ends extending into the knuckle-joints, the pitman having a series of holes, and pins through the knuckle-joints and pitmen, a hopper having a central discharge-hole, a pair of slides over the hole, and having seed-holes, and detachable connections from the pitmen to the slides.

2. The combination with a dropper-slide, and an operating-axle, carrying a crank, of a knuckle-joint pivotally mounted on said crank and a pitman longitudinally adjustable in said knuckle-joint and connected to said dropper-slide.

3. The combination with a dropper-slide, and an operating-axle carrying a crank, of a knuckle-joint pivotally mounted on said crank and connected to said dropper-slide, said knuckle-joint comprising an eye member, having a hole at right angles to the eye, and a cotter-pin through the member, the pitman having a series of holes for receiving the cotter-pin.

4. A seed-planter having a beam comprising bars, dropper-slides between said bars, cross-head guides supported on and extending across said bars and connected with said slides, respectively, and pitmen outside said bars and connected with and supported by said cross-heads, respectively.

5. In a seed-planter, a beam comprising two bars formed with a front loop for receiving the wheel and with a larger rear loop with a pair of bars extending from the neck of the front loop through the center of the rear loop and uniting with the back bar of the rear loop, a hopper on the latter pair of bars, suitable dropping-slides, a wheel within the front loop, cranks for the wheel, and suitable connections from the cranks to the slides, a rear axle on the large loop, wheels on the axle, and suitable plows carried by the frame.

6. In combination with a plow-beam, a hopper mounted thereon, dropper-slides for the hopper, cross-head guides on opposite sides of the beam in front of the hopper, cross-heads mounted on the respective guides, a gage-wheel and axle, cranks thereon, pitmen connecting the cranks and respective cross-heads, and means for detachably connecting the dropper-slides with the cross-heads.

7. In combination with a plow-beam, a hopper mounted thereon, dropper-slides for the hopper, cross-head guides on opposite sides of the beam in front of the hopper, cross-heads mounted on the respective guides, a gage-wheel and axle, cranks thereon, pitmen connecting the cranks and cross-heads, screws threaded into the cross-heads, each dropper-slide having a hole for engaging an end of a screw.

8. In combination with a plow-beam, a hopper mounted thereon, dropper-slides for the hopper, cross-head guides on the beam, cross-heads mounted on the guides, an operating-axle carrying cranks, knuckle-joints pivotally mounted on the cranks, pitmen adjustable in the knuckle-joints, and connected to the cross-heads, and means for detachably connecting the dropper-slides with the cross-heads.

9. In combination with a plow-beam, a hopper mounted thereon, slideways in the hopper-bottom, dropper-slides to slide therein, anticlogging gates pivotally attached to the sides of the slideways at the front and rear end of said hopper, said anticlogging gates exerting a yielding pressure upon the outer ends of the dropper-slides.

10. In combination with a plow-beam, a hopper mounted thereon, slideways in the hopper-bottom, dropper-slides to slide therein, anticlogging gates pivotally attached to the sides of the slideways at the front and rear ends of the hopper, said anticlogging gates provided with means for automatically adjusting themselves to thick and thin dropper-slides.

In testimony whereof I have hereunto set my hand, at Los Angeles, California, this 1st day of August, 1904.

PHILIP LE SUEUR.

In presence of—
GEORGE T. HACKLEY,
JULIA TOWNSEND.